UNITED STATES PATENT OFFICE.

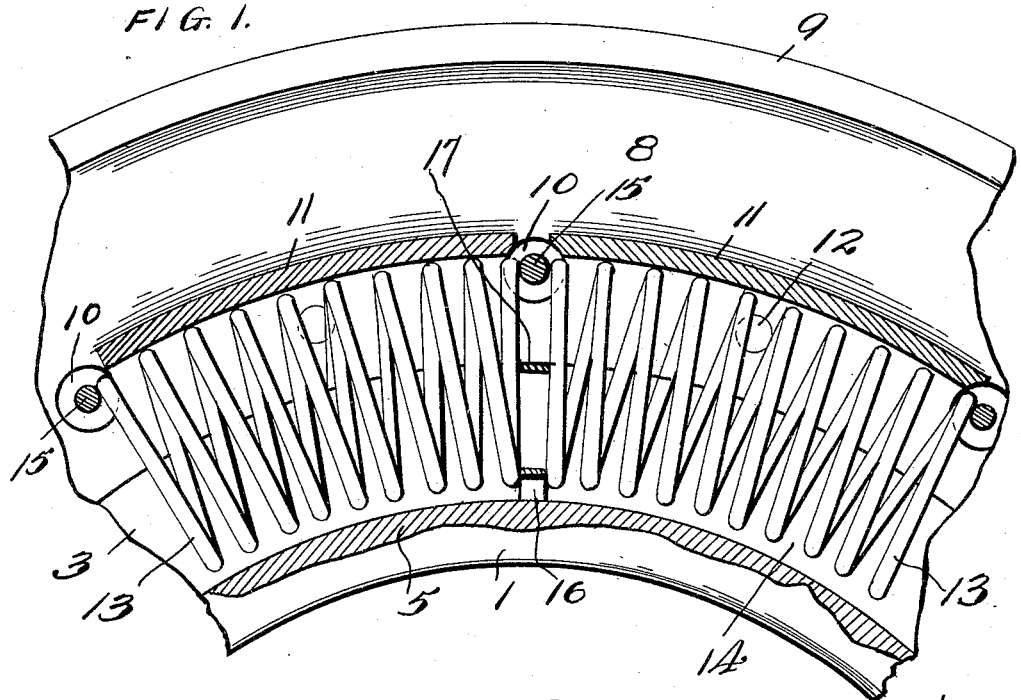
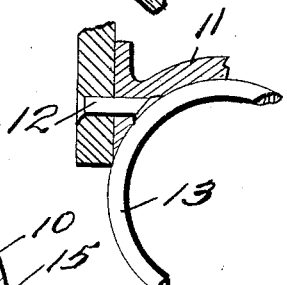
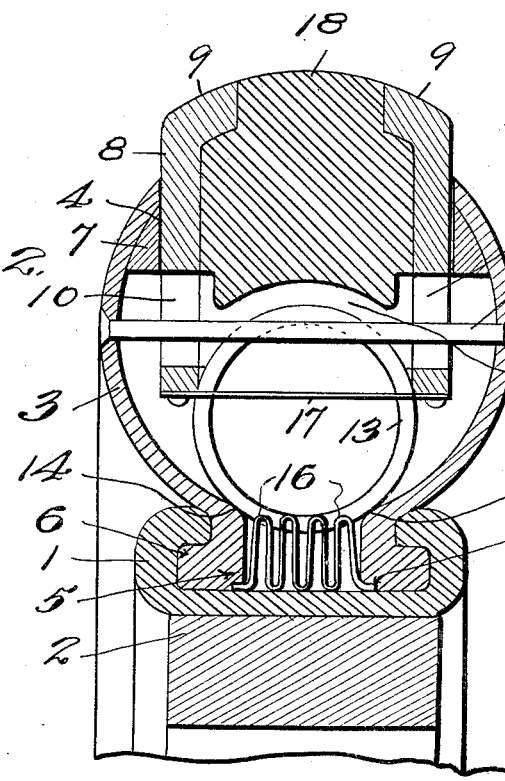

WINFIELD S. TEMPLE, OF SIDNEY, ILLINOIS.

RESILIENT TIRE.

1,067,949.  Specification of Letters Patent.  Patented July 22, 1913.

Application filed September 9, 1912.  Serial No. 719,390.

*To all whom it may concern:*

Be it known that I, WINFIELD S. TEMPLE, citizen of the United States, residing at Sidney, in the county of Champaign and State of Illinois, have invented certain new and useful Improvements in Resilient Tires, of which the following is a specification.

The present invention relates to improvements in resilient tires of automobile wheels, and is designed to provide an improved wheel of this character which will be durable, simple in construction, comparatively light, and well adapted to receive and absorb shocks encountered in traveling.

The invention consists essentially in certain novel combinations and arrangements of a series of springs within a casing, in order to resiliently support a tread member that is incased within the casing, as will be hereinafter pointed out, and claimed.

In the accompanying drawings I have illustrated one complete example of the physical embodiment of my invention constructed according to the best mode I have so far devised for the practical application of the principles of the invention.

Figure 1 is a view in section showing a portion of a wheel and illustrating two of the springs. Fig. 2 is a vertical sectional view through the wheel tire. Fig. 3 is a detail sectional view.

In the preferred embodiment of my invention I employ the clencher rim 1 and felly 2 in connection with the tubular casing 3, which is preferably of metal and formed with an open outer face or groove 4. By means of the base 5 and flanges 6 the casing is locked within the rim 1, and these parts are rigidly held together by means of the flat springs 16 with their ends in the recesses 16' of the bases 5. The edges of the slot 4 of the casing are reinforced within the casing by means of a ring or annulus 7, one at each side of the casing, and these rings provide guide means for the movement of the tread section of the wheel tire.

The tread section comprises a pair of rings 8, each formed with an inturned flange 9, and provided with a series of openings 10 arranged radially near the inner edge of each ring, and the plates or rings 8 are joined by a series of flanged saddles 11. These saddles 11 are as long as the distance between the openings 10 of the plates and are secured to the plates 8 by means of rivets 12.

A series of springs 13 are arranged within the casing and are inclosed between the saddles 11 of the tread and the shoulders 14 of the casing. The springs are separated at their ends by means of a bolt 15 which passes through the tire from one wall of the casing to the other wall, and also by means of separating strips 17 attached to the inner walls of the plates 8 of the tread section. A filling 18, of rubber or asphalt is provided for the tread and is held between the two plates 8 of the tread portion.

In traveling the load of the wheel is taken up by the tread portion which is moved within the casing of the tire at the point of contact of the wheel with the ground, or rather the weight moves the casing of the tire downwardly over the tread portion, and the tread portion is covered at its sides at the bottom of the wheel, while the upper portion of the tread member is exposed. The openings or perforations in the side plates permit the movement of the casing and provide accommodation for the bolts, and the springs because of their resiliency absorb the movement of the parts. The springs may also be compressed longitudinally, and upon any circumferential displacement of the separating strip 17 one of the adjacent springs will be compressed between said separating strip at one end and the transverse bolt 15 and spring 16 at the other end.

What I claim is:—

A wheel tire comprising a tubular casing having an annular open slot, a tread portion projecting through said slot and formed with transverse slots, a series of bolts rigid with the casing extending through the transverse slots, a coiled spring located between each pair of bolts, and a separator located between adjacent springs and attached to the tread portion, whereby upon circumferential displacement of the separator one of the adjacent springs will be compressed as described.

In testimony whereof I affix my signature in presence of two witnesses.

WINFIELD S. TEMPLE.

Witnesses:
J. BURT PORTERFIELD,
T. B. McELROY.

Copies of this patent may be obtained for five cents each, by addressing the "Commissioner of Patents, Washington, D. C."